United States Patent
Lunev et al.

(10) Patent No.: US 10,761,872 B1
(45) Date of Patent: Sep. 1, 2020

(54) WINDOWS MEMORY REDUCTION AT BOOT TIME BY MEMORY PAGE RESET TO ZERO FOR VIRTUAL MACHINE

(71) Applicant: Virtuozzo International GmbH, Schaffhausen (CH)

(72) Inventors: Denis Lunev, Moscow (RU); Alexey Kobets, Seattle, WA (US)

(73) Assignee: Virtuozzo International GmbH, Schaffhausen (CH)

( * ) Notice: Subject to any disclaimer, the term of this patent is extended or adjusted under 35 U.S.C. 154(b) by 130 days.

(21) Appl. No.: 15/840,619

(22) Filed: Dec. 13, 2017

(51) Int. Cl.
*G06F 9/00* (2006.01)
*G06F 9/455* (2018.01)
*G06F 12/1009* (2016.01)
*G06F 9/4401* (2018.01)

(52) U.S. Cl.
CPC ........ *G06F 9/45558* (2013.01); *G06F 9/4401* (2013.01); *G06F 9/45545* (2013.01); *G06F 12/1009* (2013.01); *G06F 2009/45583* (2013.01)

(58) Field of Classification Search
CPC . G06F 9/45558; G06F 9/4401; G06F 9/45545
See application file for complete search history.

(56) References Cited

U.S. PATENT DOCUMENTS

| | | | | |
|---|---|---|---|---|
| 6,085,296 A | * | 7/2000 | Karkhanis | G06F 12/1009 711/147 |
| 9,135,038 B1 | * | 9/2015 | Uchronski | G06F 9/45533 |
| 2014/0281356 A1 | * | 9/2014 | Buschardt | G06F 12/1009 711/206 |

OTHER PUBLICATIONS

Dumais, Patrick, "Writing a Hypervisor With Intel VT-X", Jun. 21, 2017, www. dumais.io, p. 2.*

* cited by examiner

*Primary Examiner* — Reginald G Bragdon
*Assistant Examiner* — Michael L Westbrook
(74) *Attorney, Agent, or Firm* — Bardmesser Law Group (57) ABSTRACT

A method for zeroing guest memory of a VM during boot up, includes the guest OS attempts to set a page to zero. A page fault is generated and is handled by the hypervisor. The page is mapped by the hypervisor to a page in host memory, and is given to the guest. The guest OS attempts to set the next page to zero. Another page fault is generated the hypervisor unmaps the host memory page, and the second page is mapped to the same page. The hypervisor then gives the page to the guest, which contains all zeros. The process is repeated for remaining pages of the guest memory.

14 Claims, 6 Drawing Sheets

WINDOWS MEMORY REDUCTION AT BOOT TIME BY MEMORY PAGE RESET TO ZERO FOR VIRTUAL MACHINE

BACKGROUND OF THE INVENTION

Field of the Invention

The present invention relates to management of memory in a Virtual Machines at start up, and more particularly, to reducing the memory footprint that a Virtual Machine requires to start up.

Description of the Related Art

One of the problems of Virtual Machines that run MICROSOFT WINDOWS is the fact that MICROSOFT WINDOWS, at boot up, zeros out all the available memory pages. For example, if a Virtual Machine has 8 gigabytes of allocated memory, one of the first things that the guest operating system (in this case, MICROSOFT WINDOWS) will do at boot up is to zero out all of the pages that form the 8 gigabytes. This occurs regardless of whether MICROSOFT WINDOWS is the host operating system or the guest operating system—it is a feature of MICROSOFT WINDOWS boot up that MICROSOFT WINDOWS zeroes out the entire memory (or, at least, a large amount of memory) allocated to it, regardless of whether it is actually using that memory, or not.

In the case of Virtual Machines, a frequent problem with this results from overcommitment—with multiple Virtual Machines installed on a single host node, the combined memory allocated to all the Virtual Machines frequently exceeds the actual physical available memory on the host node. This leads to several issues that affect the amount of memory necessary for the VM to start up. The guest wants to "touch" most of the available memory, which in turn means that there will be problems with overcommitment (despite the fact that overcommitment of memory is a standard practice). Also, setting all the memory pages to zero is time consuming, and interferes with the overcommitment.

Another problem also has to do with overcommit issue, in particular, with the page swap due to insufficient memory in the case where many VMs with WINDOWS guests are started simultaneously. Since the hypervisor needs to free up memory from somewhere, and it might not have sufficient unused or free memory, some of the pages need to be swapped to the disk, based on some algorithm (such as least recently used—LRU—or similar). At the same time, many VMs try to access almost all memory available to them. The fact that this occurs while the Virtual Machine attempts to boot up is a source of additional slow down, since such page swaps are time intensive (since it involves disk operations).

One approach that has been tried is to, in effect, hack the MICROSOFT WINDOWS boot code (or LINUX boot code), and attempt to modify it to force it to zero fewer than all of the pages that are in theory allocated to it. However, the hacking of the MICROSOFT WINDOWS is not a desirable approach. For one, different versions of MICROSOFT WINDOWS require their own hacks. Also, any modifications of the core functions are inherently undesirable and can cause instabilities.

The other approach can be, for example, in the case of LINUX host, usage of KSM, which is, in this context, a module of the host operating system that looks for identical pages, in order to combine them into a single page, and free up physical memory. KSM, which is inherent in LINUX, scans the contents of the page, calculating a CRC or hash, and then comparing the hashes. This is a relatively computationally intensive operation, and it often occurs at the same time as the Virtual Machine is attempting to boot up, thereby interfering to some extent with the boot up. So, from one side, KSM helps to reduce memory usage, but from another, KSM can further slow down the system.

Another problem of KSM is that it starts scanning pages periodically and works rather slow. So, even if it is working during boot up of the VM, it is not able to identify and merge pages as fast as the VM accesses and zeroes them (i.e., it is too slow to catch up). Therefore, it cannot reduce memory pressure in time. So KSM does not solve problems, which occur during simultaneous boot up of multiple VMs with WINDOWS guests.

Accordingly, there is a need in the art for a system and method that minimizes the use of memory by MICROSOFT WINDOWS at boot time, particularly in the context of Virtual Machine start up.

SUMMARY OF THE INVENTION

The invention relates to a method and system for managing and reducing the demands for host memory at boot time for a MICROSOFT WINDOWS Virtual Machine, that substantially obviates one or more disadvantages of the related art.

In one aspect, a system, method and computer program product for zeroing guest memory of a Virtual Machine (VM) during boot up, include:
(a) setting a host memory page to zero;
(b) issuing a command to access a first guest memory page to zero;
(c) waiting for a page fault and transferring the page fault to a supervisory component running on a host node;
(d) mapping the first guest memory page to the host memory page;
(e) giving the host memory page to the VM to correspond to the first guest memory page;
(f) in the VM, setting the first guest memory page to zero;
(g) issuing a command to access a second guest memory page to zero;
(h) triggering a second page fault and transferring the second page fault to the supervisory component;
(i) unmapping the first guest memory page from the host memory page;
(j) mapping the second guest memory page to the host memory page;
(k) giving the host memory page to the VM to correspond to the second guest memory page;
(l) in the VM, setting the second guest memory page to zero; and
(m) repeating steps (g) though (l) for remaining pages of the guest memory.

Optionally, the supervisory component, in step (i), first checks if the host memory page is already mapped to the VM. Optionally, step (m) is repeated until a predetermined counter value is reached.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
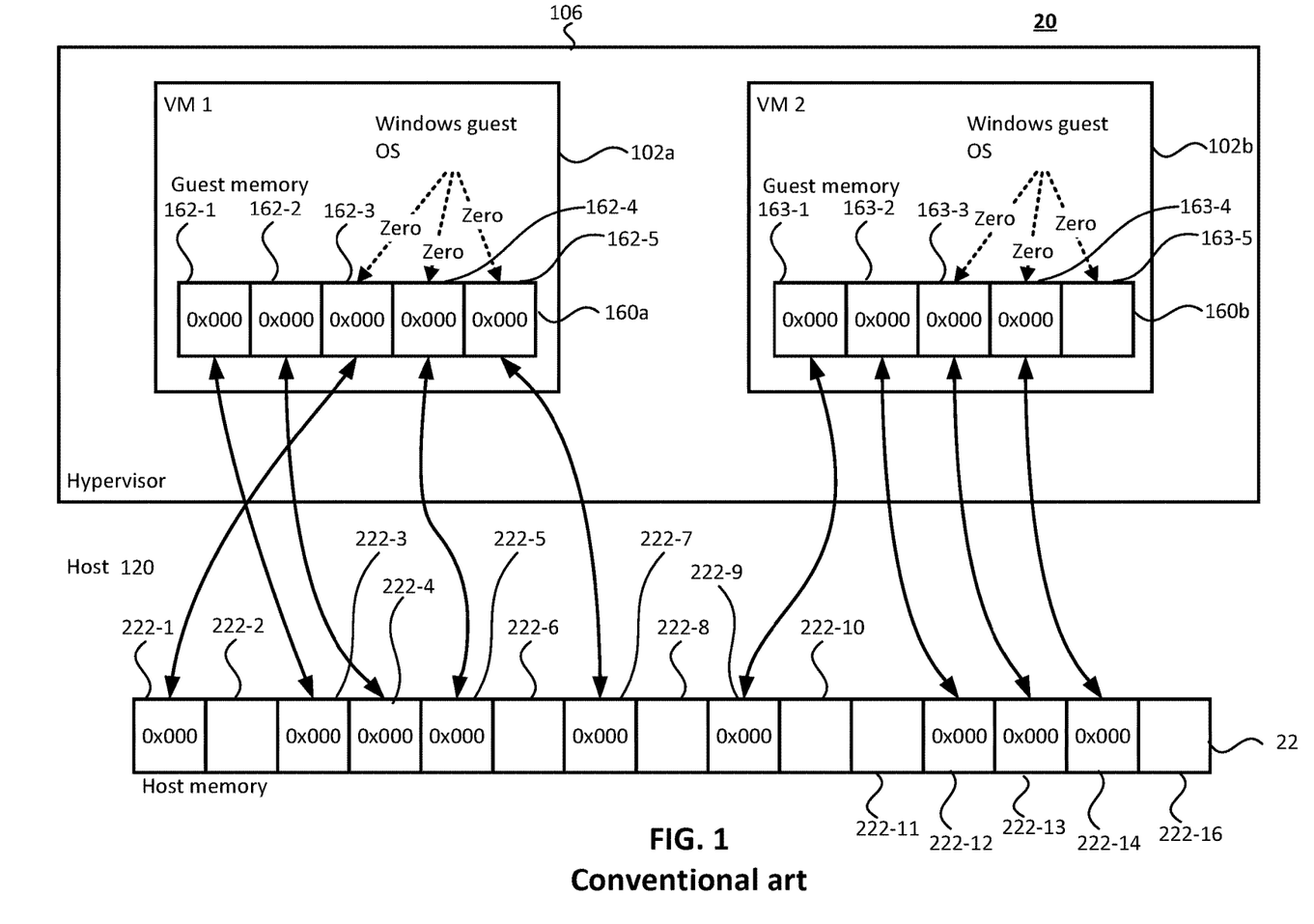
FIG. 1 illustrates a conventional Virtual Machine zeroing at boot time process.

FIG. 1 illustrates a conventional mechanism of memory initialization at startup of a guest operating system. As shown in FIG. 1, a host node 20 has physical memory 22, composed of multiple pages. A hypervisor or a Virtual Machine monitor or a similar supervisory component (106) starts Virtual Machines (in this example 102a and 102b). Virtual Machines are running MICROSOFT WINDOWS as the guest operating system. At boot up, considering Virtual Machine 102a, the guest MICROSOFT WINDOWS OS starts zeroing its memory 160a. In this example, 8 gigabytes of memory can be considered as initialized to Virtual Machine 102a. The pages 160a are mapped by the hypervisor to the host memory 22, as shown by the arrows.

Note that it is the responsibility of the hypervisor to ensure that the pages in the host memory 22 that it gives to the guest are zeroed out, for security reasons (in other words, to ensure that data of another Virtual Machine does not leak into the Virtual Machine 102a). The Guest in Virtual Machine 102a does not need to know that it runs in a Virtual Machine, obviously, and therefore proceeds to zero a lot of pages—up to 8 gigabytes in total, in this example. The arrows in FIG. 1 show the mapping of the pages from the guest memory (e.g., 160a) to what may be called a physical host memory 22. A similar process occurs with a Virtual Machine 102b, whose guest memory 160b needs to be mapped to other pages of the physical host memory 22.

As discussed earlier, various utilities need to run on the host side, such as KSM (Kernel Same page Merger) in LINUX and any disk swap routines. These are not shown in FIG. 1, but, as noted earlier, these are typically too slow to catch up.

Also, it will be appreciated that the use case discussed herein is primarily directed at a Virtual Machine that has been created previously, and has been configured previously. The startup at issue is the startup of a previously created Virtual Machine (in other words, analogous through a startup of a computer, except in a virtualized context). It will also be appreciated that in a typical hosting environment, a hardware node runs multiple Virtual Machines, frequently many dozens. Thus, use case described herein typically involves the startup of one or more additional Virtual Machines, which also frequently occurs in an overcommit scenario.

Figure 2:
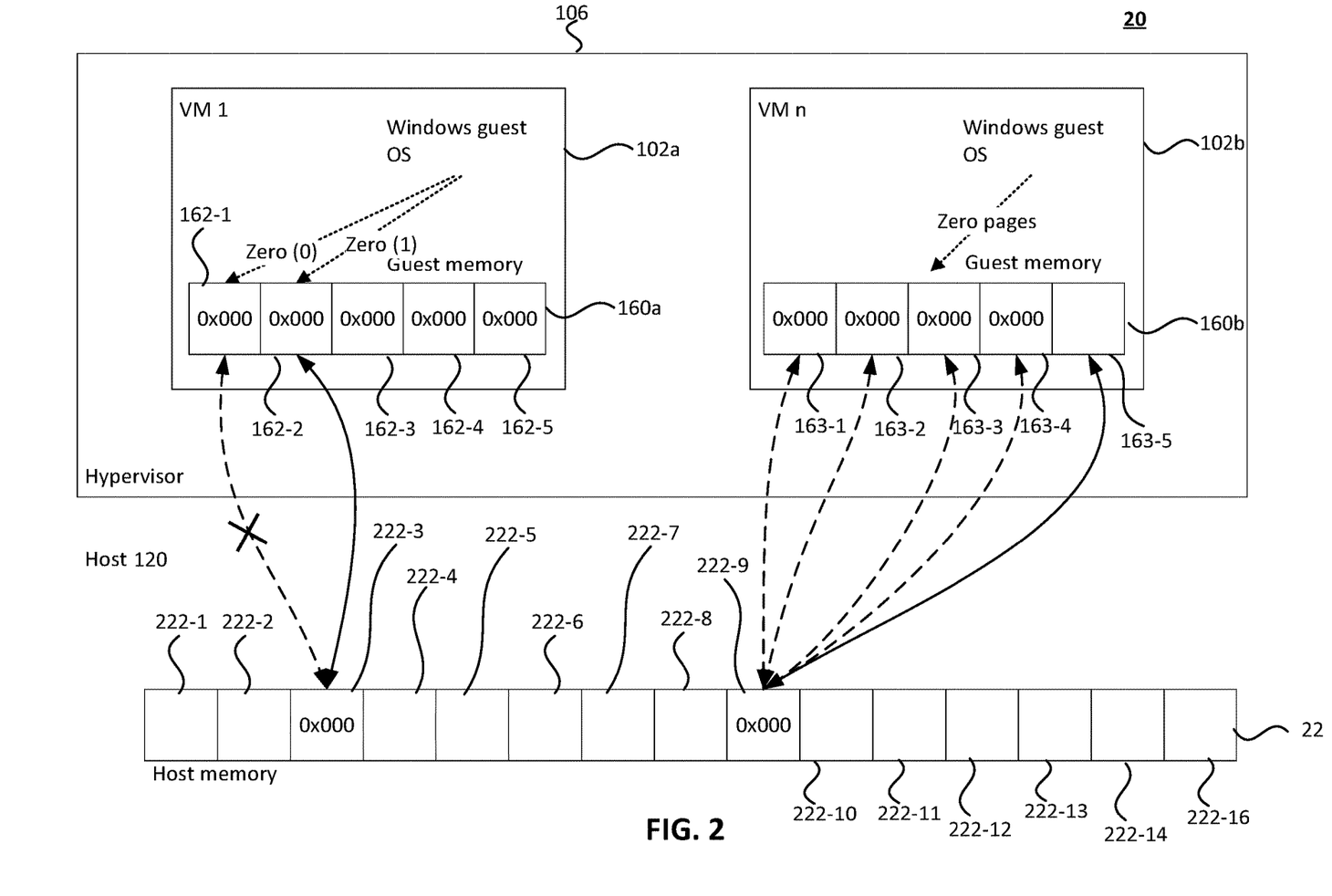
FIG. 2 illustrates the booting process according to the present invention.

FIG. 2 illustrates the functioning of the host system, in one exemplary embodiment. As shown in FIG. 2, for Virtual Machine 102a, and guest memory 160a. The first page 162-1 of the guest memory 160a is initially mapped to page 222-3 of the host memory 22. Then, after the guest OS zeroes this page, the mapping is broken (i.e., the guest page 162-1 is unmapped), and guest page 162-2 is mapped to the same host page 222-3. After that, guest OS zeroes the page 162-2. Then the operation will be repeated with the next page. In other words, the dashed lines show the previous mappings, and the solid lines show the current page being mapped. Similarly, with the Virtual Machine 102b and the guest memory 160b, the pages are mapped to the physical memory 22 (page 222-9). First, the guest OS tried to zero the page 163-1, the hypervisor mapped this page to the host page 222-9, (and returned control to the guest). Then the guest OS zeroes the page 163-1 and attempts to zero the page 163-2. The hypervisor, then, unmaps the guest page 163-1 (from the host memory) and maps the guest page 163-2 to the host page 222-9. This operation repeats with the next page and so on. These pages are mapped to the host page 222-9, zeroed and then unmapped. So, instead of using lots of host memory pages during VM boot up, the hypervisor in this embodiment uses just one host page, and all guest memory pages that guest wants to zero are mapped to this one host page. After the guest stops zeroing its memory the hypervisor will work with guest pages as usual, i.e., it will spot using just one host memory page.

This method of booting of the VM will consume considerably less memory than was consumed in prior art, therefore under load the whole system will work much faster.

Figure 3:
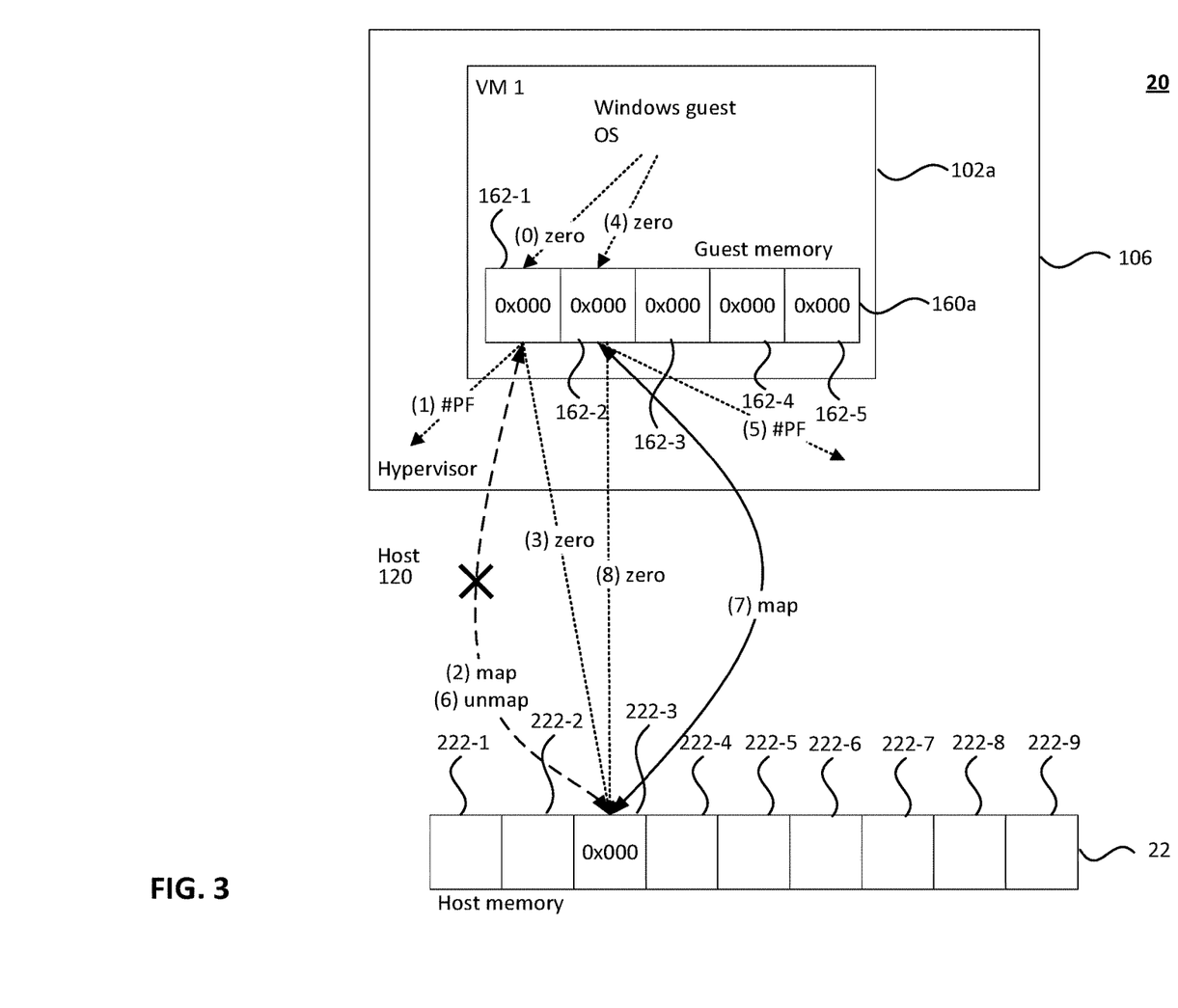
FIG. 3 illustrates the step by step booting process, according to the present invention.

FIG. 3 shows the steps of the method, where the number of the step is shown in parentheses. In step (0), the guest operating system (e.g., MICROSOFT WINDOWS) attempts to fill page 162-1 with zeroes. When the guest OS tries to access the page, a host page fault exception is generated in step (1) (it also can be EPT (Extended Page Table) fault or RVI (Rapid Virtualization Indexing) fault depending on the architecture), because at this step the guest page 162-1 is not yet mapped to any host page (e.g., because it was the first time the guest accesses the page). Nested paging (also known as Second Level Address Translation), such as EPT or RVI, allows for mapping guest pages to host pages, i.e., for performing translation from guest physical addresses to host physical pages using nested page tables. Then the page fault is handled by the hypervisor, in step (2). The guest page 162-1 is mapped by the hypervisor to host page 222-3. (If nested paging is used, then such "mapping" means that corresponding addresses are written to nested page tables. If there is no nested paging, then addresses of guest and host pages (e.g., guest physical and host virtual) are written to a data structure in the hypervisor, which is responsible for mapping guest and host pages.) Then the hypervisor, in some aspects, zeroes it (in other aspects it can, for example, check that the page is already zeroed). Then the hypervisor returns control to the gest OS in VM. So, it can be said that the hypervisor "gives" the page 222-3 to the guest. In step (3) the guest OS successfully zeroes the page 162-1, which is mapped to the page 222-3. In step (4), the guest operating system attempts to fill page 162-2 with zeroes. In step (5), another page fault is triggered, and then (in steps (6-7)) is handled by the hypervisor. In step (6), the page 162-1 (which have already been zeroed) is unmapped from a host memory page 222-3. In step (7), guest page 162-2 is mapped to same host page 222-3, and control is transferred to the guest. Also, in step (7) the hypervisor can check the page is zeroed or zero to page. in other words, the hypervisor "gives" page 222-3 to the guest, so that it becomes page 162-2, which contains all zeros. In step (8) the guest OS fills the page 162-2 with zeroes, i.e., zeros the page. Then steps (4)-(8) are repeated for other pages that need to be zeroed.

In some aspects, step (6) is done only if the previous guest page (e.g., 162-1) has already been successfully zeroed. E.g., if that page (162-1) was not zeroed, or something else (not zeroes) was written to it, then the hypervisor, in some aspects, do not perform unmapping of this page from the corresponding host page (e.g. 222-3) (i.e., it may mean that this guest page will be used by the guest one more time soon), and the hypervisor uses another host page (e.g., 222-4) for the next guest page (e.g., 162-2).

In some aspects, if the previous guest page contains not only zeroes, then the hypervisor changes a special "non-zero-page" (or "zero-page") counter, which will help to identify when the guest OS stops zeroing its pages.

Figure 4:
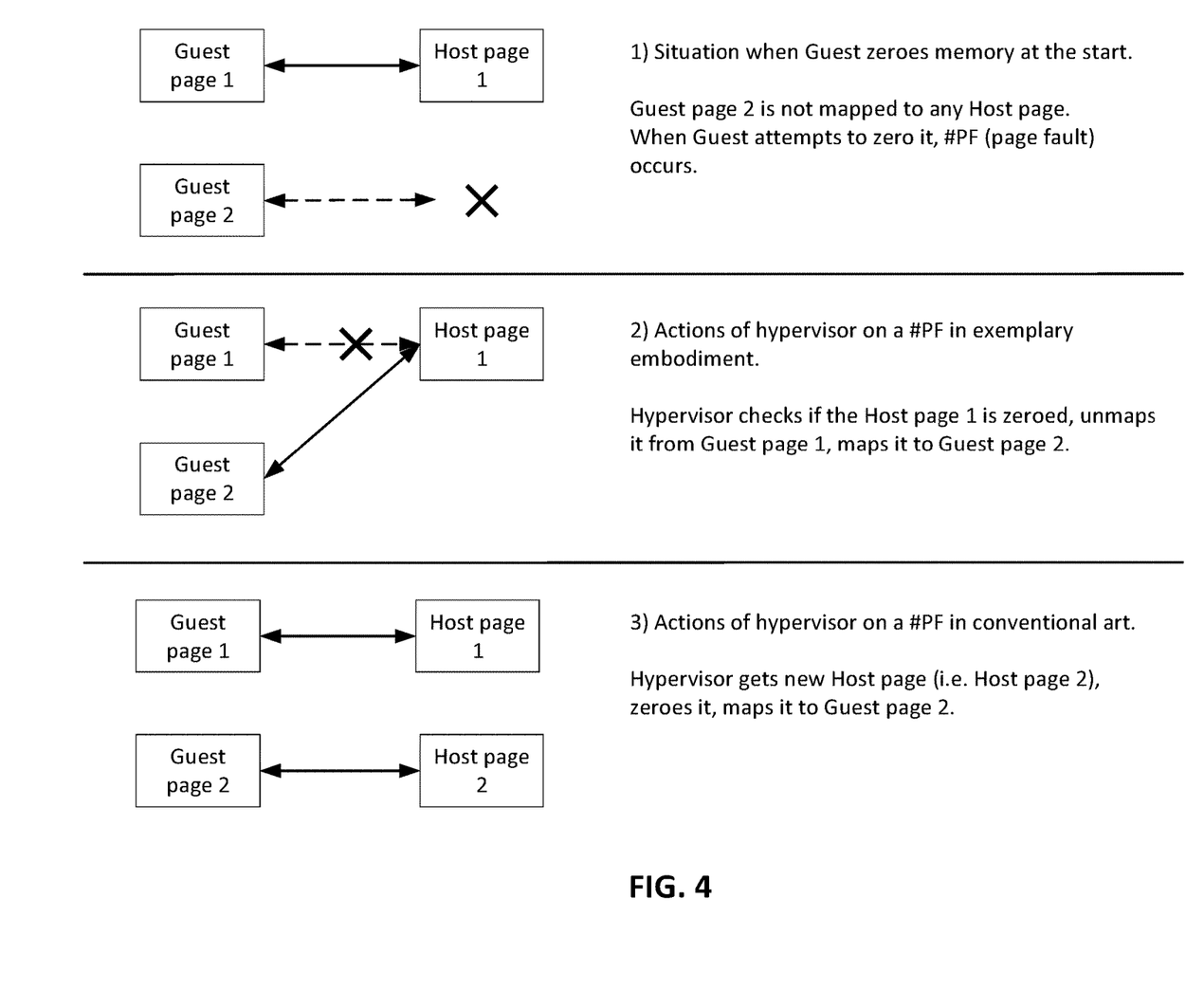
FIG. 4 compares the process of booting of the present invention versus the conventional scheme.

FIG. 4 illustrates a comparison between the present invention and a conventional mechanism for zeroing out of (initialization of) memory at boot up. The top one third of the figure illustrates a situation that occurs in both cases—i.e., both with and without the present invention. In other words, it is the situation, in which the invention works. There, a guest operating system begins zeroing the memory at boot up. A first page of the guest (guest page 1) is mapped to a first physical page (host page 1) on the host (i.e., in host physical memory 22) by the hypervisor. When the guest attempts to zero the second page (guest page 2), a page fault occurs, because this guest page is not mapped to any host page.

The bottom one third of FIG. 4 illustrates a conventional scheme, where the second page of the guest memory, which the guest operating system is attempting to zero, is mapped to a second (and different) page of the host memory 22. This is a situation that the invention attempts to avoid. The mechanism for doing this is illustrated in the center portion of FIG. 4, where, when the guest attempts to zero the second page of its memory at boot up, that page is mapped to the same first host page of the host memory 22, and the previous mapping of the prior guest page is unmapped. In other words, the hypervisor checks if the host page 1 is zeroed, unmaps it from guest page 1, and maps it to guest page 2.

Figure 5:
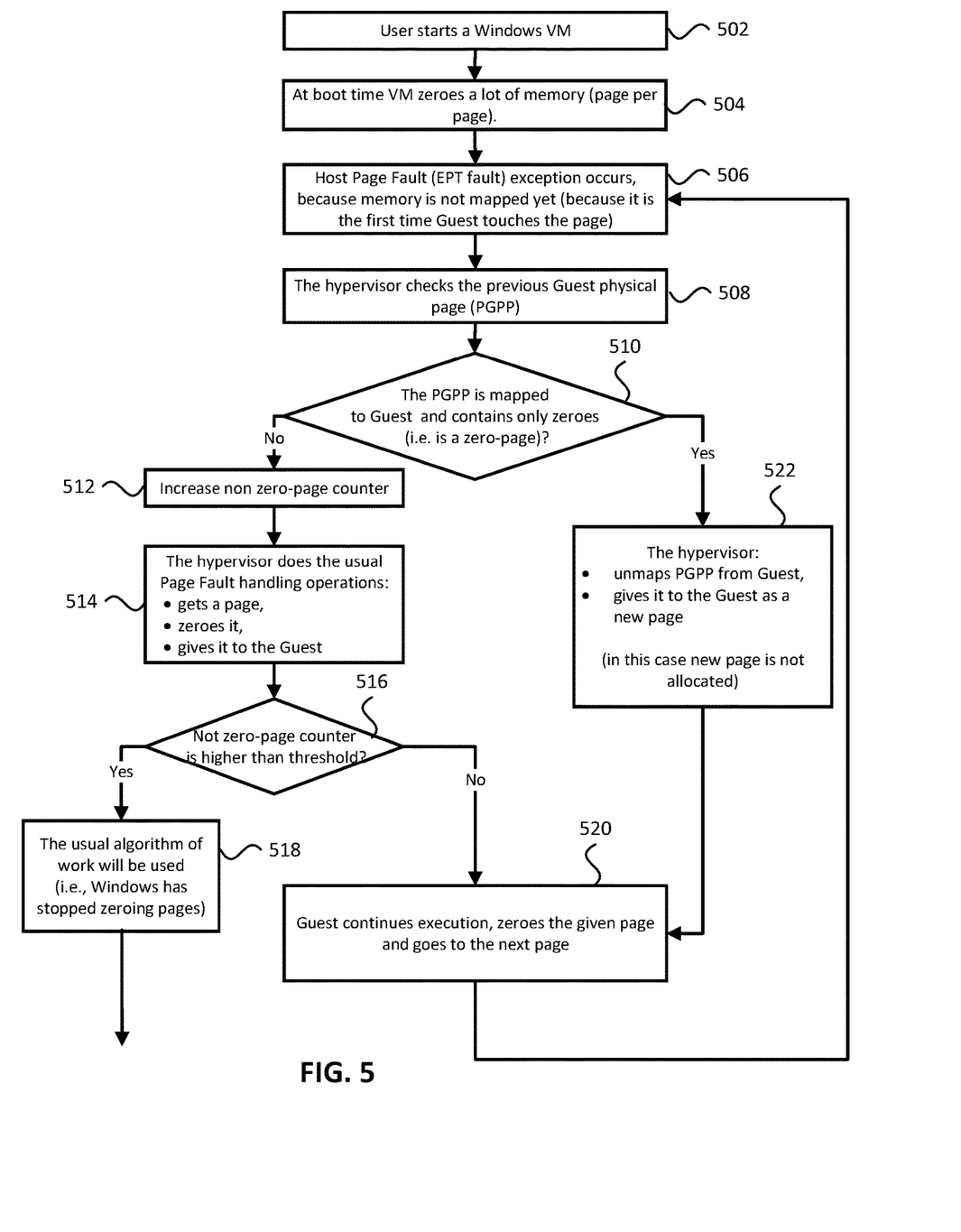
FIG. 5 shows a flowchart of the method of memory allocation for Virtual Machines at boot up, according to the present invention.

FIG. 5 illustrates the algorithm, according to the present invention. As shown in FIG. 5, in step 502, the user starts a Virtual Machine with MICROSOFT WINDOWS as the guest operating system. Note again that, typically, this would be a Virtual Machine that has been previously created at some point, and is already configured by the hypervisor, or the VMM or a similar supervisory component. Also, note that the guest OS is not necessary WINDOWS, but any OS that zeroes lots of its available memory at boot time.

In step 504, when the Virtual Machine started booting, it begins to zero its memory page by page. In step 506, a host page fault exception occurs (e.g., EPT fault or similar) when the guest attempts to zero a page, since the guest page has not been mapped to physical memory yet, and it is the first time that the guest is attempting to access the page. In step 508, the hypervisor checks the previous guest physical page (i.e., the host page that is mapped to the guest page that was accessed just before the current guest page, i.e., the host page which was given to VM on the previous page fault handling operation), whether it contains only zeroes or not. This is done by checking the guest physical address that was previously used, if any, since the hypervisor knows the address that the Virtual Machine was previously attempting to access. Also, the hypervisor knows the host page which was given to VM on the previous page fault handling operation, so it can also check this page.

In step 510, the algorithm checks whether the previous guest physical page is mapped to the guest (VM) (i.e., a mapping between that guest physical page and any host physical page exists) and contains only zeros. If it does, then the hypervisor, in step 522 un-maps the previous guest physical page from the guest (i.e., deletes that mapping) (like it was done on step (6) in FIG. 3), and gives it to the guest as the new page (i.e., maps the current (the one on which the page fault occurred at step 506) guest page to this host page, and transfers control to guest). (Here, the hypervisor can optionally skip zeroing the page before giving it to the guest (or even skip checking that the page contains only zeroes), because it was already checked at step 508.) Note that no new host pages need to be allocated in this case. In step 520, the guest operating system continues execution as it normally would, zeroing the page that was given to it by the hypervisor (notwithstanding the fact that the page already contains only zeros), and goes to the next page. The algorithm then returns to step 506.

If, in step 510, the previous guest physical page is not mapped or do not contain only zeroes, then the hypervisor, in step 512, increases the non-zero-page counter. The counter is a mechanism used to ensure that the process doesn't run forever. The situation with zeroing lots of memory pages occures only on booting up of the guest OS in VM (e.g., in several first seconds of the boot up). So, after the guest is booted, the condition on step 510 will be fulfilled is a fairly rare occurrence. So, steps 510 and 522 do not always need to be performed, in practice.

In sum, it is necessary to know when the guest stops zeroing its memory pages. To this end, the hypervisor uses such a counter. If the value of the counter is not high, this means that the guest is still zeroing its memory. And if the counter value becomes higher than a threshold, then the hypervisor considers that the guest stopped zeroing, and will work as usual, i.e., will not perform checking 508 any longer. The maximum value for the counter is empirically determined (generally depending on how much memory is allocated to the VM), but it's typically a large number, such as 100,000 or 500,000, but generally depends on guest memory size.

In step 514, the hypervisor performs the normal operations that occur when a page fault is triggered (e.g., EPT fault), such as getting a page, zeroing it and giving it to the guest in Virtual Machine. In step 516, if the counter is higher than the threshold (see description above), then it means that the guest stopped zeroing its pages and that the boot up stage is over, in step 518, the hypervisor is now working normally (without mapping lots of guest pages on one host page), and the algorithm essentially is finished. Thus, the step 508—checking the pages for zeros, etc. will not be called any further. For example, the hypervisor can have two versions of handling page faults (e.g., 2 handler functions) and call one of them depending on the counter value. One variant will work during boot up and, for example, perform the steps of the algorithm from FIG. 5, and the other will be a standard hypervisor page fault handler function, which works in all other cases (e.g., performing only steps 506, 514, 518).

In step 516, if the counter is lower than the threshold, then the algorithm proceeds to step 520, and performs the action that was described above.

Also the counter is not necessarily a non-zero page counter, which increases when a page containing nonzero elements occures. The counter, in other aspects, can be a zero-page counter, which, for example, can decrease when a page is zeroed, so if it becomes less than zero, then it will mean that the guest is done zeroing pages. In such aspects, the steps 512, 516 will be different from those shown on the FIG. 5, but the general idea is the same.

One major benefit is the reduced amount of memory required at startup.

Another benefit of the invention is, as discussed earlier, in the fact that many of the activities performed by the host (e.g., LINUX) routines (e.g., involve Kernel Same page Merger and handling of overcommit) are no longer necessary to perform at boot up. Overcommit is a very common situation in a hosting environment, particularly when multiple Virtual Machines are already running on a host node. With KSM and forced disk swap routines, the startup of a Virtual Machine can take on the order of seconds, if not longer. Since, with the present invention, only one host page (or, at most, a handful of host pages) actually needs to be allocated and zeroed, the entire process of booting up the Virtual Machine can take a fraction of a second.

Note also that, in FIG. 2, each VM has its own "zero page" that is allocated to it in host physical memory 22. In reality, this is not, strictly speaking, necessary—pages of multiple Virtual Machines can be mapped to the same host physical "zero page", for purposes of the algorithm above. Also, VMs can have several "zero pages", which can be used, for example, for purposes of increasing performance of page zeroing (e.g., in parallel programming).

Note also that the size of the page is not, strictly speaking, limited. A 4 KB page is commonly used, but the invention is not limited to this example, and the page can be as large as several megabytes, and even multiple gigabytes.

The concept described above is applicable to MICROSOFT WINDOWS, and to any other OS that performs the memory zeroing at start up or similar operations.

Figure 6:
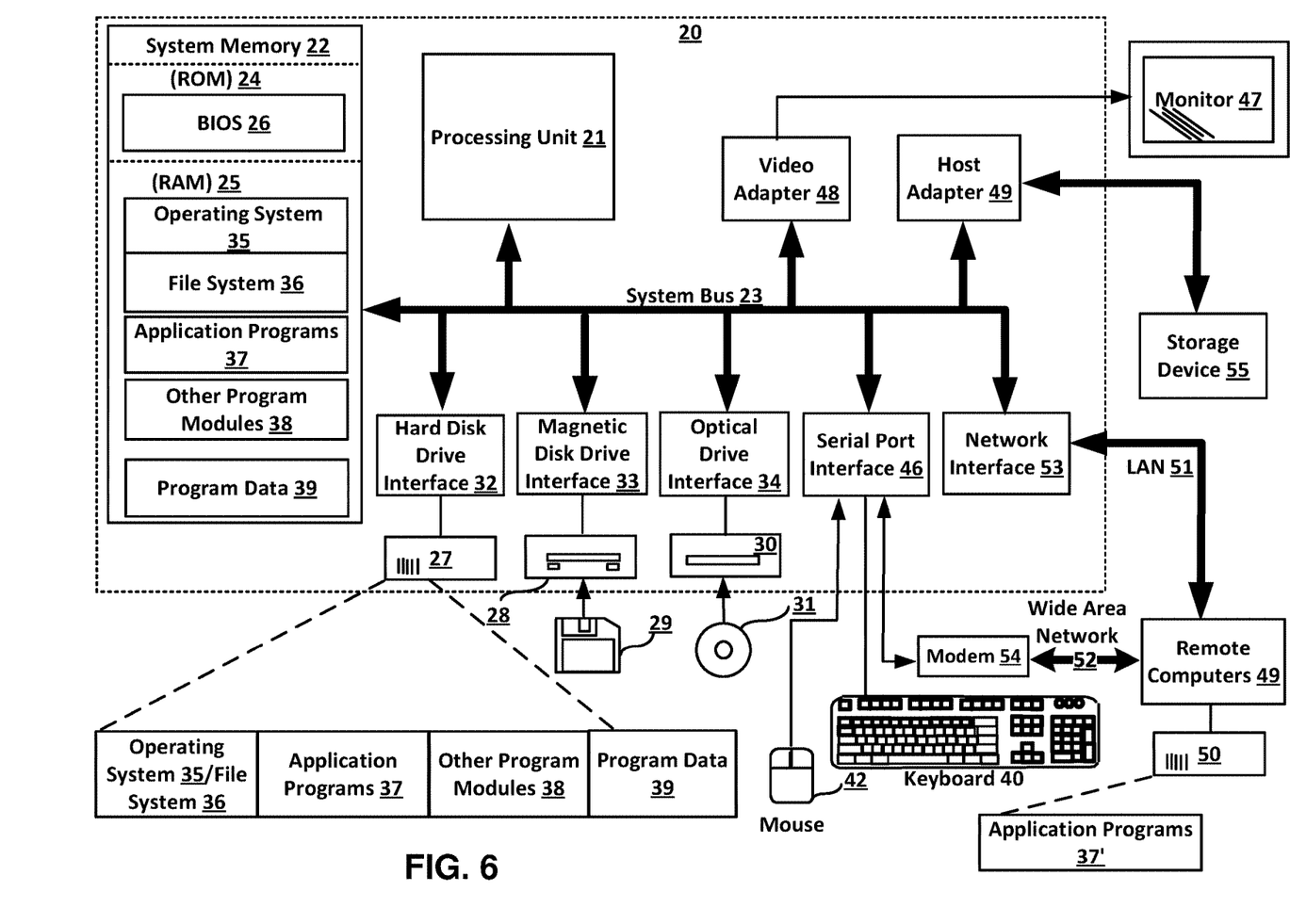
FIG. 6 illustrates an exemplary computer, server or hardware node that can be used to implement the invention.

With reference to FIG. 6, an exemplary system for implementing the invention includes a general purpose computing device in the form of a host computer/node or a server 20 or the like, including a processing unit 21, a system memory 22, and a system bus 23 that couples various system components including the system memory to the processing unit 21.

The system bus 23 may be any of several types of bus structures including a memory bus or memory controller, a peripheral bus, and a local bus using any of a variety of bus architectures. The system memory includes a read-only memory (ROM) 24 and random access memory (RAM) 25. A basic input/output system 26 (BIOS), containing the basic routines that help to transfer information between the elements within the personal computer 20, such as during start-up, is stored in ROM 24.

The server 20 may further include a hard disk drive 27 for reading from and writing to a hard disk, not shown herein, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively.

The drives and their associated computer-readable media provide non-volatile storage of computer readable instructions, data structures, program modules and other data for the server 20. Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (e.g., MICROSOFT Windows™ 2000). The server 20 includes a file system 36 associated with or included within the operating system 35, such as the Windows NT™ File System (NTFS), one or more application programs 37, other program modules 38 and program data 39. A user may enter commands and information into the server 20 through input devices such as a keyboard 40 and pointing device 42.

Other input devices (not shown) may include a microphone, joystick, game pad, satellite dish, scanner or the like. These and other input devices are often connected to the processing unit 21 through a serial port interface 46 that is coupled to the system bus, and they may also be connected by other interfaces, such as a parallel port, game port or universal serial bus (USB). A monitor 47 or other type of display device is also connected to the system bus 23 via an interface, such as a video adapter 48. In addition to the monitor 47, computers typically include other peripheral output devices (not shown), such as speakers and printers.

The server 20 may operate in a networked environment using logical connections to one or more remote computers 49. The remote computer (or computers) 49 may be another personal computer, a server, a router, a network PC, a peer device or other common network node, and it typically includes some or all of the elements described above relative to the server 20, although here only a memory storage device 50 is illustrated. The logical connections include a local area network (LAN) 51 and a wide area network (WAN) 52. Such networking environments are common in offices, enterprise-wide computer networks, Intranets and the Internet.

In a LAN environment, the server 20 is connected to the local network 51 through a network interface or adapter 53. When used in a WAN networking environment, the server 20 typically includes a modem 54 or other means for establishing communications over the wide area network 52, such as the Internet.

The modem 54, which may be internal or external, is connected to the system bus 23 via the serial port interface 46. In a networked environment, the program modules depicted relative to the server 20, or portions thereof, may be stored in the remote memory storage device. It will be appreciated that the network connections shown are merely exemplary and other means of establishing a communications link between the computers may be used.

Having thus described a preferred embodiment, it should be apparent to those skilled in the art that certain advantages of the described method and apparatus have been achieved.

It should also be appreciated that various modifications, adaptations, and alternative embodiments thereof may be made within the scope and spirit of the present invention. The invention is further defined by the following claims.

What is claimed is:

1. A method for zeroing guest memory of a Virtual Machine (VM) during boot up, the method comprising:
   (a) setting a host memory page to zero;
   (b) issuing a command to set a first guest memory page to zero;
   (c) waiting for a page fault in the Virtual Machine and transferring the page fault to a supervisory component running on a host node;
   (d) mapping the first guest memory page to the host memory page;
   (e) giving the host memory page to the VM to correspond to the first guest memory page;
   (f) in the VM, setting the first guest memory page to zero;
   (g) issuing a command to set a second guest memory page to zero;
   (h) waiting for a second page fault and transferring the second page fault to the supervisory component;
   (i) unmapping the first guest memory page from the host memory page;
   (j) mapping the second guest memory page to the host memory page;
   (k) giving the host memory page to the VM to correspond to the second guest memory page;
   (l) in the VM, setting the second guest memory page to zero; and
   (m) repeating steps (g) though (l) for remaining pages of the guest memory,
   wherein the steps (a)-(m) are performed during boot up of the VM.

2. The method of claim 1, wherein the supervisory component, in step (i), first checks if the host memory page is already mapped to the VM.

3. The method of claim 1, wherein step (m) is repeated until a predetermined counter value of the first guest memory page being non-zero is reached.

4. The method of claim 1, wherein steps (a-m) are repeated for a different VM.

5. The method of claim 4, wherein the host memory page is shared for both VMs.

6. The method of claim 1, wherein multiple VMs are launched on the host, and each VM has its own host memory page that is not shared with other VMs.

7. The method of claim 1, wherein the VM has multiple host memory pages, and wherein the steps (a)-(m) are repeated for all the multiple host memory pages.

8. A system for zeroing guest memory of a Virtual Machine (VM) during boot up, the system comprising:
   (a) a hardware processor running a host operating system (OS);
   (b) a host memory page set to zero;
   (c) a guest OS of a Virtual Machine (VM) that issues a command to set a first guest memory page to zero;
   (d) a supervisory component running on the processor, and to which a first page fault in the Virtual Machine that is triggered by the command is transferred;
   (e) wherein the first guest memory page is mapped to the host memory page;
   (f) the supervisory component is configured to give the host memory page to the VM to correspond to the first guest memory page;
   (g) the VM is configured to set the first guest memory page to zero;
   (h) the guest OS is configured to issue a second command to set a second guest memory page to zero;
   (i) the supervisory component is configured to process the second page fault triggered by the second command;
   (j) the supervisory component is configured to unmap the first guest memory page from the host memory page, and to map the second guest memory page to the host memory page;
   (k) the supervisory component is configured to give the host memory page to the VM to correspond to the second guest memory page;
   (l) the VM is configured to set the second guest memory page to zero; and
   (m) wherein the supervisory component is configured to repeat (i)-(l) for remaining pages of the guest memory, and,
   (n) wherein (c)-(m) are performed during boot up of the VM.

9. The system of claim 8, wherein the supervisory component is configured to first check if the host memory page is already mapped to the VM.

10. The system of claim 8, wherein (m) is repeated until a predetermined counter value of the first guest memory page being non-zero is reached.

11. The system of claim 8, wherein the supervisory component repeats the process for a different VM.

12. The system of claim 11, wherein the host memory page is shared for both VMs.

13. The system of claim 8, wherein multiple VMs are launched on the host, and each VM has its own host memory page that is not shared with other VMs.

14. The system of claim 8, wherein the VM has multiple host memory pages, and wherein (a)-(m) are repeated for all the multiple host memory pages.

* * * * *